United States Patent
Nam et al.

(10) Patent No.: US 12,074,325 B2
(45) Date of Patent: Aug. 27, 2024

(54) ALL-SOLID-STATE BATTERY COMPRISING LITHIUM STORAGE LAYER HAVING MULTILAYER STRUCTURE AND METHOD OF MANUFACTURING SAME

(71) Applicants: HYUNDAI MOTOR COMPANY, Seoul (KR); KIA CORPORATION, Seoul (KR)

(72) Inventors: Young Jin Nam, Suwon-si (KR); Sang Wan Kim, Daejeon (KR); Jae Min Lim, Suwon-si (KR); Hong Suk Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 232 days.

(21) Appl. No.: 17/365,644

(22) Filed: Jul. 1, 2021

(65) Prior Publication Data
US 2022/0200002 A1 Jun. 23, 2022

(30) Foreign Application Priority Data

Dec. 21, 2020 (KR) ........................ 10-2020-0179799

(51) Int. Cl.
*H01M 4/62* (2006.01)
*H01M 4/02* (2006.01)
(Continued)

(52) U.S. Cl.
CPC ......... *H01M 4/623* (2013.01); *H01M 4/0404* (2013.01); *H01M 4/134* (2013.01);
(Continued)

(58) Field of Classification Search
CPC ...... H01M 4/623; H01M 4/625; H01M 4/626; H01M 2004/021; H01M 2004/027; H01M 10/0525; H01M 4/134; H01M 4/0404
See application file for complete search history.

(56) References Cited

U.S. PATENT DOCUMENTS 7,771,870 B2 * 8/2010 Affinito .................. H01M 4/62
429/50
8,481,204 B2 * 7/2013 Hama .................. H01M 10/02
429/185
(Continued)

FOREIGN PATENT DOCUMENTS

CN       101002351 A  * 7/2007  ........ H01M 10/0525
JP       2018-129159         8/2018
(Continued)

OTHER PUBLICATIONS

Modified english translation KR20180115130A, as taught by Park et al (Year: 2018).*
(Continued)

*Primary Examiner* — Brittany L Raymond
(74) *Attorney, Agent, or Firm* — Morgan, Lewis & Bockius LLP

(57) ABSTRACT

An all-solid-state battery includes: an anode current collector; a lithium storage layer including a first layer located at an electrolyte-layer side and a second layer located at an anode current collector side, having a higher porosity than the first layer, and including an interface portion and a core portion, which is a remaining portion other than the interface portion; an electrolyte layer; and a cathode layer, wherein the anode current collector, the lithium storage layer, the electrolyte layer, and the cathode layer are sequentially laminated, and the interface portion is in contact with the first layer and has a higher binder content per unit volume than the core portion.

20 Claims, 6 Drawing Sheets

(51) Int. Cl.
- *H01M 4/04* (2006.01)
- *H01M 4/134* (2010.01)
- *H01M 10/0525* (2010.01)

(52) U.S. Cl.
CPC ....... *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2010/0047691 | A1* | 2/2010 | Kawakami | H01M 4/485 429/224 |
| 2016/0301063 | A1* | 10/2016 | Yukinobu | H01M 4/049 |

FOREIGN PATENT DOCUMENTS

| | | | |
|---|---|---|---|
| KR | 20180115130 A | * 10/2018 | |
| KR | 10-2020-0056039 | 5/2020 | |
| TW | 201904120 A | * 1/2019 | ............ C08F 261/04 |
| WO | WO-2020154235 A1 | * 7/2020 | ........... C01B 32/194 |

OTHER PUBLICATIONS

Modified english translation CN-101002351-A as taught by Karaseva (Year: 2007).*
Modified translation TW201904120A (US 2020/0136145 A1) (Year: 2023).*
Vapor pressure of NMP as taught by Lyondellbasell (Year: 2023).*
Vapor pressure of water as taught by Wikipedia (Year: 2023).*
WO2020154235A1, US 2022/0115646 A1 used as equivalent translation as taught by Colwell (Year: 2020).*

* cited by examiner

ALL-SOLID-STATE BATTERY COMPRISING LITHIUM STORAGE LAYER HAVING MULTILAYER STRUCTURE AND METHOD OF MANUFACTURING SAME

CROSS REFERENCE TO RELATED APPLICATION

This application claims priority to and the benefit of Korean Patent Application No. 10-2020-0179799, filed on Dec. 21, 2020, the entire content of which are incorporated herein by reference.

FIELD

The present disclosure relates to an all-solid-state battery and a method of manufacturing the same.

BACKGROUND

The statements in this section merely provide background information related to the present disclosure and may not constitute prior art.

An all-solid-state battery is configured in the form of a three-layer laminate including a cathode composite layer bonded to a cathode current collector, an anode composite layer bonded to an anode current collector, and a solid electrolyte interposed between the cathode composite layer and the anode composite layer.

In general, the anode composite layer of an all-solid-state battery is formed by mixing an active material and a solid electrolyte to provide ionic conductivity. Since the solid electrolyte has high specific gravity compared to a liquid electrolyte, the conventional all-solid-state battery described above has low energy density compared to a lithium-ion battery.

In order to increase the energy density of an all-solid-state battery, research has been conducted on the application of lithium metal as the anode. However, there are challenges such as interfacial bonding, growth of dendrites, price, difficulty in realizing a large area, and the like.

Recently, research on a storage-type anodeless battery in which the anode of an all-solid-state battery is removed and lithium is allowed to directly precipitate at the anode-current-collector side is also ongoing. However, the above battery is disadvantageous in that the irreversible reaction gradually increases due to non-uniform precipitation of lithium, and thus the durability thereof is very poor.

SUMMARY

The present disclosure provides an anodeless all-solid-state battery capable of uniformly depositing lithium.

The present disclosure provides an all-solid-state battery capable of suppressing volume expansion due to lithium deposition.

The present disclosure further provide an all-solid-state battery having improved durability and charge/discharge efficiency by enhancing adhesion between layers of a lithium storage layer.

One form of the present disclosure provides an all-solid-state battery including: an anode current collector; a lithium storage layer including a first layer located at the electrolyte-layer side and a second layer located at the anode-current-collector side, having a higher porosity than the first layer, and including an interface portion and a core portion, which is a remaining portion other than the interference portion; an electrolyte layer; and a cathode layer, wherein the anode current collector, the lithium storage layer, the electrolyte layer, and the cathode layer are sequentially laminated, and the interface portion has higher binder content per unit volume than the core portion.

The lithium storage layer may include a carbon material and a metal powder.

The carbon material may include at least one selected from the group consisting of a particulate carbon material, a fibrous carbon material, and combinations thereof.

The particulate carbon material may include at least one selected from the group consisting of carbon black, graphitizable carbon, non-graphitizable carbon, and combinations thereof.

The fibrous carbon material may include at least one selected from the group consisting of carbon nanofibers, carbon nanotubes, vapor-grown carbon fibers, and combinations thereof.

The metal powder may include at least one selected from the group consisting of aluminum (Al), zinc (Zn), indium (In), silver (Ag), gold (Au), magnesium (Mg), silicon (Si), bismuth (Bi), germanium (Ge), platinum (Pt), antimony (Sb), and combinations thereof.

In the all-solid-state battery, the thickness ratio of the first layer and the second layer may be 1:0.5-2.

The first layer may have a porosity of 5% or less.

The second layer may have a porosity of 5% to 50%.

The first layer may include a polyvinylidene fluoride (PVDF) binder.

The second layer may include a polyvinylidene fluoride (PVDF) binder and a nitrile butadiene rubber (NBR) binder.

The interface portion may have higher nitrile butadiene rubber binder content per unit volume than the core portion.

The thickness of the interface portion may be 0.1% to 10% of the thickness of the second layer.

In addition, the present disclosure provides a method of manufacturing an all-solid-state battery, including: preparing a first binder solution including a polyvinylidene fluoride (PVDF) binder and a first solvent; preparing a second binder solution including a nitrile butadiene rubber (NBR) binder and a second solvent, different from the first solvent; preparing a first slurry including a carbon material, a metal powder, and the first binder solution; preparing a second slurry by adding the second binder solution to the first slurry; forming a second layer by applying the second slurry on a substrate; forming a first layer by applying the first slurry on the second layer and obtaining a lithium storage layer including the first layer and the second layer; and forming an all-solid-state battery by sequentially laminating an anode current collector, the lithium storage layer, an electrolyte layer, and a cathode layer, wherein the first layer is located at the electrolyte-layer side and the second layer, having higher porosity than the first layer, is located at the anode-current-collector side, the second layer includes an interface portion, which is in contact with the first layer, and a core portion, which is a remaining portion other than the interface portion, and the interface portion has higher binder content per unit volume than the core portion.

The second solvent may have lower density than the first solvent, may have higher solubility of a nitrile butadiene rubber (NBR) binder than the solubility of a polyvinylidene fluoride (PVDF) binder, or may have higher vapor pressure than the first solvent.

The first solvent may include N-methyl-2-pyrrolidone (NMP) and the second solvent may include hexyl butyrate.

The second slurry may have lower solid content than the first slurry.

The solid content of the first slurry may be 4 wt % to 10 wt %.

The solid content of the second slurry may be 3 wt % or less.

Here, after applying the second slurry on the substrate, the second layer may be dried or allowed to stand such that the second binder solution rises to the surface of the second layer.

According to the present disclosure, an anodeless all-solid-state battery capable of uniformly depositing lithium can be obtained.

Also, according to the present disclosure, an all-solid-state battery capable of suppressing volume expansion due to lithium deposition can be obtained.

Also, according to the present disclosure, an all-solid-state battery having improved durability and charge/discharge efficiency by enhancing adhesion between layers of a lithium storage layer can be obtained.

The effects of the present disclosure are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
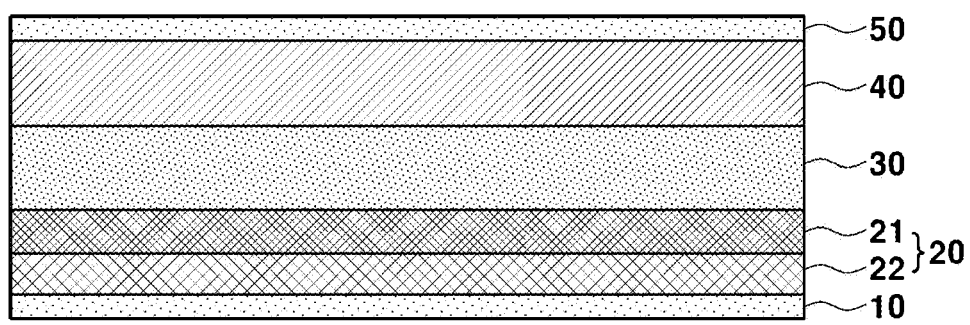
FIG. 1 is a cross-sectional view showing an all-solid-state battery according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a cross-sectional view showing an all-solid-state battery according to the present disclosure. With reference thereto, the all-solid-state battery includes an anode current collector 10, a lithium storage layer 20, an electrolyte layer 30, a cathode layer 40, and a cathode current collector 50.

The anode current collector 10 may be a kind of sheet-shaped substrate.

The anode current collector layer 10 may be a metal thin film including at least one metal selected from the group consisting of copper (Cu), nickel (Ni), and combinations thereof. Specifically, the anode current collector layer 10 may be a high-density metal thin film having a porosity of less than about 1%.

The anode current collector layer 10 may have a thickness of 1 μm to 20 μm, particularly 5 μm to 15 μm.

The lithium storage layer 20 provides a space in which lithium ions ($Li^+$) that move through the electrolyte layer 30 from the cathode layer 40 during charging of the all-solid-state battery are stored in the form of a lithium metal or a lithium compound.

The lithium storage layer 20 may include a carbon material and a metal powder.

The carbon material may include at least one selected from the group consisting of a particulate carbon material, a fibrous carbon material, and combinations thereof.

Specifically, the particulate carbon material may include at least one selected from the group consisting of carbon black, graphitizable carbon, non-graphitizable carbon, and combinations thereof.

Also, the fibrous carbon material may include at least one selected from the group consisting of carbon nanofibers, carbon nanotubes, vapor-grown carbon fibers, and combinations thereof.

The metal powder may serve as a kind of seed for lithium ions in the lithium storage layer 20. Specifically, when the all-solid-state battery is charged, lithium ions ($Li^+$) that have moved to the lithium storage layer 20 mainly grow into lithium around the metal powder.

The metal powder may include at least one selected from the group consisting of aluminum (Al), zinc (Zn), indium (In), silver (Ag), gold (Au), magnesium (Mg), silicon (Si), bismuth (Bi), germanium (Ge), platinum (Pt), antimony (Sb), and combinations thereof.

The particle size ($D_{50}$) of the metal powder is not particularly limited, but may be, for example, 0.01 μm to 5 μm, or 0.1 μm to 1 μm.

The lithium storage layer 20 may include a first layer 21 located at the electrolyte-layer-30 side and a second layer 22 located at the anode-current-collector-10 side.

The thickness of each of the first layer 21 and the second layer 22 is not particularly limited, and may be, for example, 2 μm to 10 μm, and the thickness ratio of the first layer 21 and the second layer 22 may be 1:0.5-2.

The present disclosure is characterized in that the second layer 22 is designed to have higher porosity than the first layer 21. By increasing the porosity of the second layer 22 at the anode-current-collector-10 side, lithium ions ($Li^+$) are allowed to precipitate within the second layer 22 and/or between the second layer 22 and the anode current collector 10. Accordingly, the lithium metal and/or the lithium compound may be uniformly deposited, and the volume expansion of lithium may be effectively suppressed. Moreover, since the precipitated lithium metal and/or lithium compound may be located near the anode current collector 10, which is a pathway of electrons, dead lithium may not be generated during discharge of the battery.

The porosity of the first layer 21 and the second layer 22 is not particularly limited, but, for example, the porosity of the first layer 21 may be 5% or less. On the other hand, the porosity of the second layer 22 may be 5% to 50%, or 20% to 30%.

Figure 2:
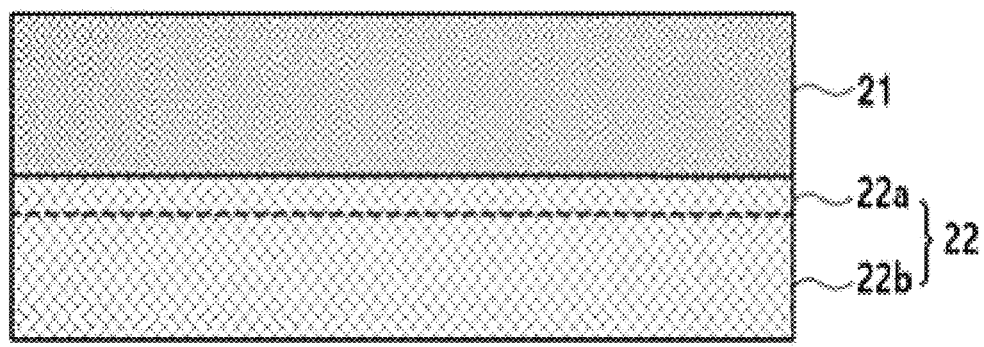
FIG. 2 is a cross-sectional view showing the lithium storage layer of the all-solid-state battery according to one form of the present disclosure.

FIG. 2 is a cross-sectional view showing the lithium storage layer 20. With reference thereto, the second layer 22 may include an interface portion 22a in contact with the first layer 21 and a core portion 22b, which is a remaining portion other than the interface portion 22a.

The thickness of the interface portion 22a is not particularly limited, but, for example, may be 0.1% to 10% or 0.1% to 5% of the thickness of the second layer 22.

The lithium storage layer 20 may be provided in the form of a multilayer structure including the first layer 21 and the second layer 22, and since volume expansion occurs due to precipitation and/or deposition of lithium, layers may be easily separated from each other when adhesion therebetween is weak.

The present disclosure is characterized in that the interface portion 22a of the second layer 22 is designed to have high binder content per unit volume to thus increase the adhesion of the first layer 21 and the second layer 22.

The first layer 21 includes a polyvinylidene fluoride (PVDF) binder, in addition to the above-described carbon material and metal powder.

The second layer 22 includes a polyvinylidene fluoride (PVDF) binder and a nitrile butadiene rubber (NBR) binder, in addition to the carbon material and metal powder.

The interface portion 22a may include higher nitrile butadiene rubber (NBR) binder content per unit volume than the core portion 22b. Accordingly, as described above, the total binder content per unit volume of the interface portion 22a may be adjusted to be higher than that of the core portion 22b. A method of manufacturing the lithium storage layer 20 having a multilayer structure designed as described above is described later.

Moreover, the binder content per unit volume of the interface portion 22a and the core portion 22b is not particularly limited, and as long as it is set so as to satisfy the above relationship, it should be considered to fall within the scope of embodiments and modifications of the present disclosure.

The electrolyte layer 30 is interposed between the lithium storage layer 20 and the cathode layer 40 such that lithium ions may move between the two components.

The electrolyte layer 30 may include an oxide-based solid electrolyte or a sulfide-based solid electrolyte. Here, the use of a sulfide-based solid electrolyte, having high lithium ionic conductivity, is preferable. The sulfide-based solid electrolyte is not particularly limited, and may be $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (in which m and n are positive numbers and Z is any one of Ge, Zn and Ga), $Li_2S$—$GeS_2$, $Li_2S$—$SiS_2$—$Li_3PO_4$, $Li_2S$—$SiS_2$—$Li_xMO_y$ (in which x and y are positive numbers and M is any one of P, Si, Ge, B, Al, Ga and In), $Li_{10}GeP_2S_{12}$, etc.

The cathode layer 40 may include a cathode active material, a solid electrolyte, a conductive material, a binder, and the like.

The cathode active material may be an oxide active material or a sulfide active material.

The oxide active material may be a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$ or the like, a spinel-type active material such as $LiMn_2O_4$, $Li(Ni_{0.5}Mn_{1.5})O_4$ or the like, an inverse-spinel-type active material such as $LiNiVO_4$, $LiCoVO_4$ or the like, an olivine-type active material such as $LiFePO_4$, $LiMnPO_4$, $LiCoPO_4$, $LiNiPO_4$ or the like, a silicon-containing active material such as $Li_2FeSiO_4$, $Li_2MnSiO_4$ or the like, a rock-salt-layer-type active material in which a portion of a transition metal is substituted with a different metal, such as $LiNi_{0.8}Co_{(0.2-x)}Al_xO_2$ (0<x<0.2), a spinel-type active material in which a portion of a transition metal is substituted with a different metal, such as $Li_{1+x}Mn_{2-x-y}M_yO_4$ (M being at least one of Al, Mg, Co, Fe, Ni and Zn, 0<x+y<2), or lithium titanate such as $Li_4Ti_5O_{12}$ or the like.

The sulfide active material may be copper chevrel, iron sulfide, cobalt sulfide, nickel sulfide, or the like.

The solid electrolyte may be an oxide solid electrolyte or a sulfide solid electrolyte. Here, the use of a sulfide-based solid electrolyte, having high lithium ionic conductivity, is preferable. The sulfide-based solid electrolyte is not particularly limited, and may be $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (in which m and n are positive numbers and Z is any one of Ge, Zn and Ga), $Li_2S$—$GeS_2$, $Li_2S$—$SiS_2$—$Li_3PO_4$, $Li_2S$—$SiS_2$—$Li_xMO_y$ (in which x and y are positive numbers and M is any one of P, Si, Ge, B, Al, Ga and In), $Li_{10}GeP_2S_{12}$, etc. The solid electrolyte may be the same as or different from that included in the electrolyte layer 30.

The conductive material may be carbon black, conductive graphite, ethylene black, graphene, or the like.

The binder may be BR (butadiene rubber), NBR (nitrile butadiene rubber), HNBR (hydrogenated nitrile butadiene rubber), PVDF (polyvinylidene difluoride), PTFE (polytetrafluoroethylene), CMC (carboxymethylcellulose), or the like, and may be the same as or different from the binder included in the lithium storage layer 20.

The cathode current collector layer 50 may be made of aluminum foil or the like.

Figure 3:
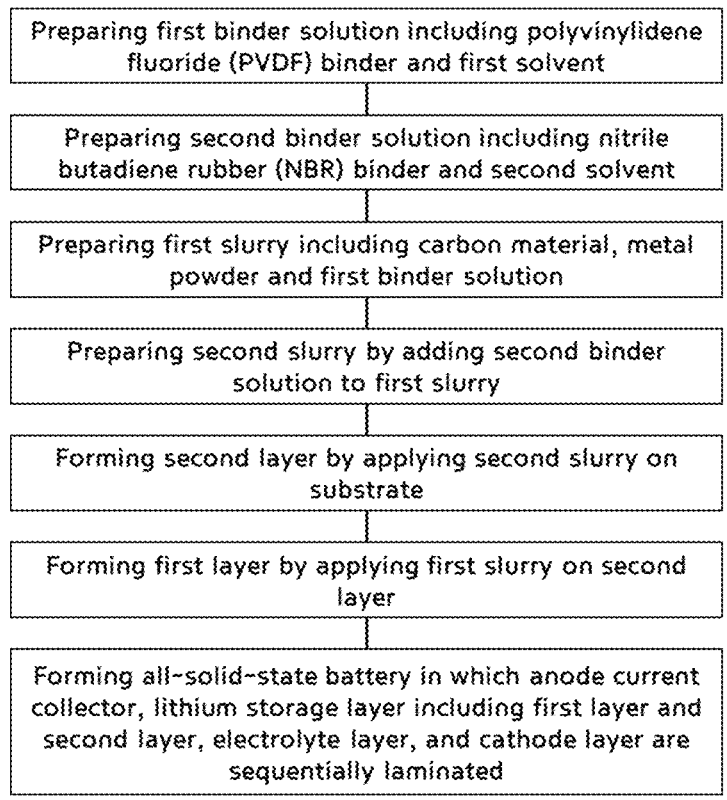
FIG. 3 is a flowchart showing a process of manufacturing the all-solid-state battery according to one form of the present disclosure.

FIG. 3 is a flowchart showing the process of manufacturing the all-solid-state battery according to the present disclosure. With reference thereto, the manufacturing method includes: preparing a first binder solution including a polyvinylidene fluoride (PVDF) binder and a first solvent; preparing a second binder solution including a nitrile butadiene rubber (NBR) binder and a second solvent; preparing a first slurry including a carbon material, a metal powder and the first binder solution; preparing a second slurry by adding the second binder solution to the first slurry; forming a second layer by applying the second slurry on a substrate; forming a first layer by applying the first slurry on the second layer and obtaining a lithium storage layer including the first layer and the second layer, and forming an all-solid-state battery in which an anode current collector, the lithium storage layer, an electrolyte layer, and a cathode layer are sequentially laminated.

The all-solid-state battery according to the present disclosure is characterized in that the porosity of the second layer 22 is higher than that of the first layer 21. To this end, the solid content of the second slurry may be adjusted to be lower than that of the first slurry. Specifically, the solid content of the first slurry may be 4 wt % to 10 wt %, and the solid content of the second slurry may be 3 wt % or less.

Also, the all-solid-state battery according to the present disclosure is characterized in that the binder content per unit volume of the interface portion 22a in the second layer 22 is higher than that of the core portion 22b. To this end, after the second slurry is applied on the substrate, the second layer may be dried or allowed to stand such that the second binder solution rises to the surface of the second layer 22.

Here, the first solvent and the second solvent may be appropriately selected in order to adjust the fluidity of the second binder solution.

The second solvent may have lower density than the first solvent.

The first solvent that is selected is a solvent in which the solubility of the polyvinylidene fluoride (PVDF) binder is higher than the solubility of the nitrile butadiene rubber (NBR) binder, and the second solvent that is selected is a solvent in which the solubility of the nitrile butadiene rubber (NBR) binder is higher than the solubility of the polyvinylidene fluoride (PVDF) binder.

Moreover, the second solvent may have higher vapor pressure than the first solvent.

When the second solvent contained in the second binder solution has lower density than the first solvent, has different solubilities of the polyvinylidene fluoride (PVDF) binder and the nitrile butadiene rubber (NBR) binder, or has higher vapor pressure than the first solvent, the fluidity of the second binder solution is increased compared to that of the first binder solution, and thus, the second layer 22 is allowed to stand for a predetermined period of time after formation thereof, whereby the second binder solution rises to the vicinity of the surface of the second layer to form the interface portion 22a.

The first solvent may include N-methyl-2-pyrrolidone (NMP).

The second solvent may include hexyl butyrate.

Owing to the use of a polar solvent and a nonpolar solvent having different polarities as the first solvent and the second solvent, the second binder solution may rise more easily.

The method of laminating the anode current collector, the lithium storage layer, the electrolyte layer, and the cathode layer is not particularly limited, and each configuration may be manufactured and then laminated, or each configuration may be formed directly on the configuration of the lower layer in the order of lamination.

A better understanding of the present disclosure may be obtained through the following examples. However, these examples are merely set forth to illustrate the present disclosure, and are not to be construed as limiting the scope of the present disclosure.

EXAMPLE

A first binder solution was prepared by mixing a polyvinylidene fluoride (PVDF) binder and N-methyl-2-pyrrolidone (NMP) as a first solvent.

A second binder solution was prepared by mixing a nitrile butadiene rubber (NBR) binder and hexyl butyrate as a second solvent.

A first slurry was prepared by mixing Super C65 as a carbon material, a silver (Ag) powder, and the first binder solution. Here, a small amount of dispersant was added thereto.

Part of the first slurry was taken, and the second binder solution was added thereto to prepare a second slurry.

The solid content of the first slurry was adjusted to about 6%, and the solid content of the second slurry was adjusted to about 3%.

A second layer was formed by applying the second slurry to a thickness of about 4 μm on the anode current collector. The second layer was dried to obtain a second layer including an interface portion and a core portion.

A first layer was formed by applying the first slurry to a thickness of about 4 μm on the second layer, and a lithium storage layer was ultimately obtained.

An all-solid-state battery was formed by laminating an electrolyte layer, a cathode layer, and a cathode current collector on the lithium storage layer.

Comparative Example 1

An all-solid-state battery was formed in the same manner as in Example, with the exception that the lithium storage layer was formed by applying the first slurry of Example to a thickness of about 8 μm on the anode current collector.

Comparative Example 2

The solid content of the first slurry of Example was adjusted to about 3%, after which the first slurry was applied to a thickness of about 4 μm on an anode current collector to form a second layer.

A first layer was formed by applying the first slurry (having a solid content of about 6%) of Example on the second layer. With that exception, the same procedures as in Example were performed, thereby forming an all-solid-state battery.

Test Example 1—Measurement of Adhesion and Porosity

The adhesion and porosity of the lithium storage layers of Example, Comparative Example 1 and Comparative Example 2 were measured. The results thereof are shown in Table 1 below.

TABLE 1

| | Items | Comparative Example 1 | Comparative Example 2 | Example |
|---|---|---|---|---|
| Adhesion [gf/mm] | Second layer/anode current collector | 3.9 | 3.9 | 3.9 |
| | First layer/second layer | No interface | Separation (not measured) | 1.6 |
| Porosity [%] | First layer | 3-5% | 20-30% | 20-30% |
| | Second layer | | 3-5% | 3-5% |

As is apparent from Table 1, in Example, the adhesion between the first layer and the second layer was about 1.6 gf/mm, but in Comparative Example 2, immediate separation occurred, and thus evaluation of adhesion was impossible. Accordingly, as in the present disclosure, when the lithium storage layer was configured such that the second layer included an interface portion having high binder content per unit volume and a core portion, it was possible to inhibit separation of two layers due to volume expansion of the second layer.

Test Example 2—Analysis with Scanning Electron Microscope (SEM)

Scanning Electron Microscopy was Performed on the all-Solid-State Batteries of Example and Comparative Example 1.

Figure 4:
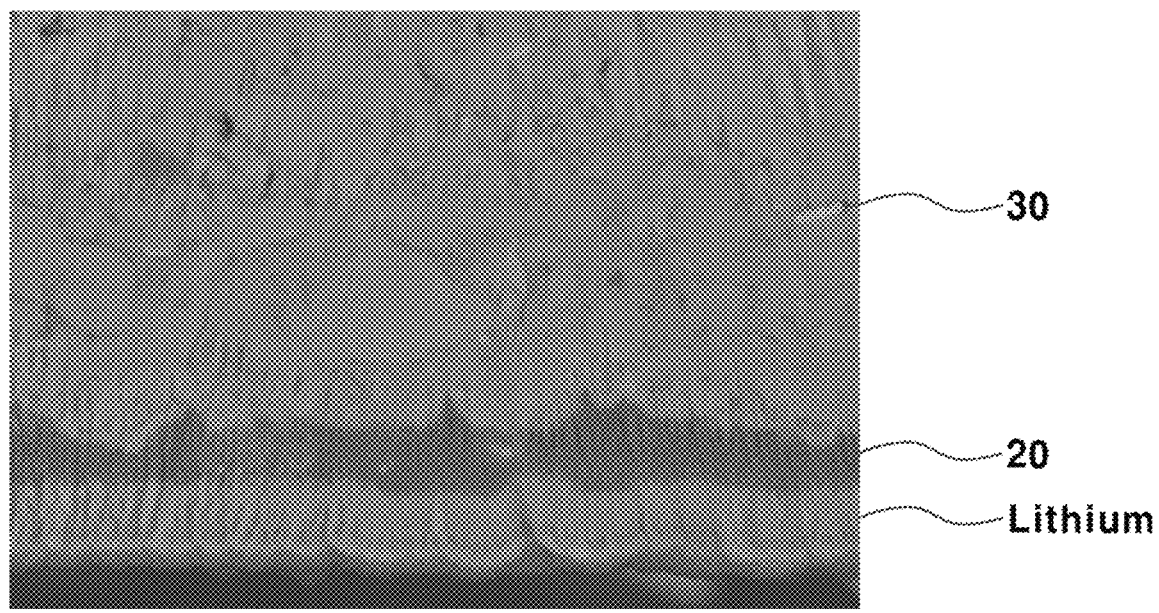
FIG. 4 is a scanning electron microscope (SEM) image showing the cross section of the all-solid-state battery of Example when charged.

FIG. 4 shows the cross section of the all-solid-state battery of Example when charged. With reference thereto, it can be seen that lithium precipitated uniformly between the lithium storage layer 20 and the anode current collector.

Figure 5:
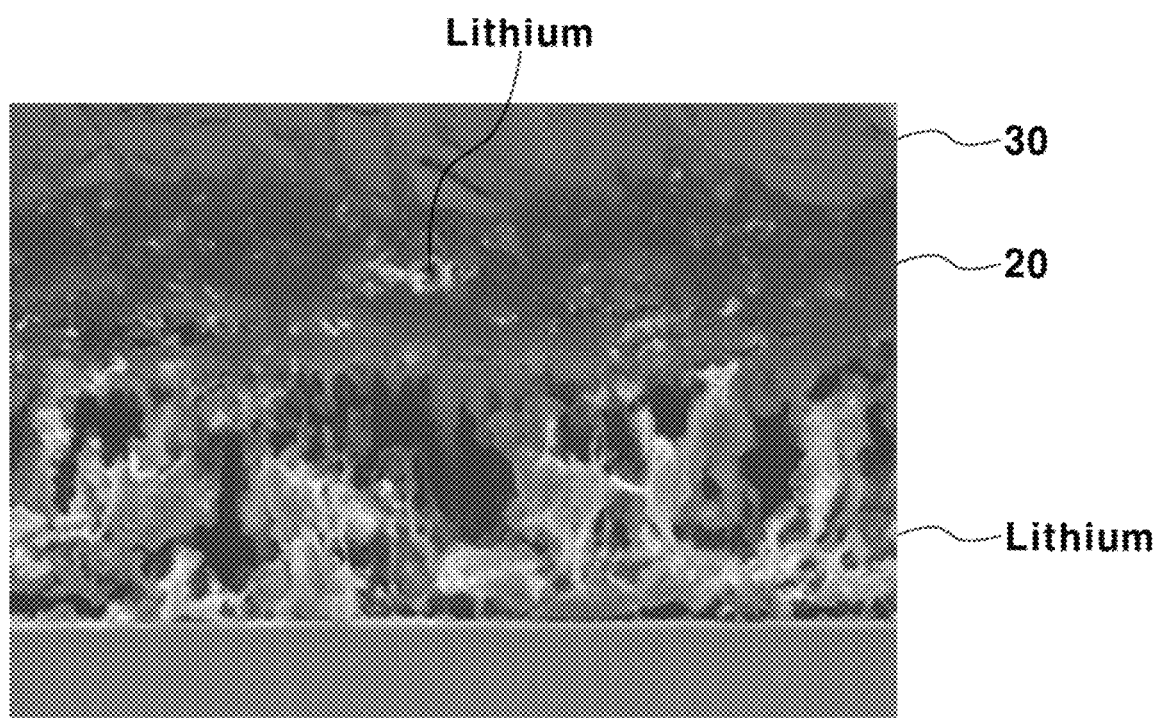
FIG. 5 shows an SEM image showing the cross section of the all-solid-state battery of Comparative Example 1 when charged.

Meanwhile, FIG. 5 shows the cross section of the all-solid-state battery of Comparative Example when charged. With reference thereto, it can be seen that lithium precipitated irregularly, and that dead lithium was formed in the lithium storage layer.

Test Example 3 Evaluation of Charge/Discharge Characteristics

The capacity retention and coulombic efficiency of the all-solid-state batteries of Example and Comparative Example 1 were measured and evaluated.

Figure 6A:
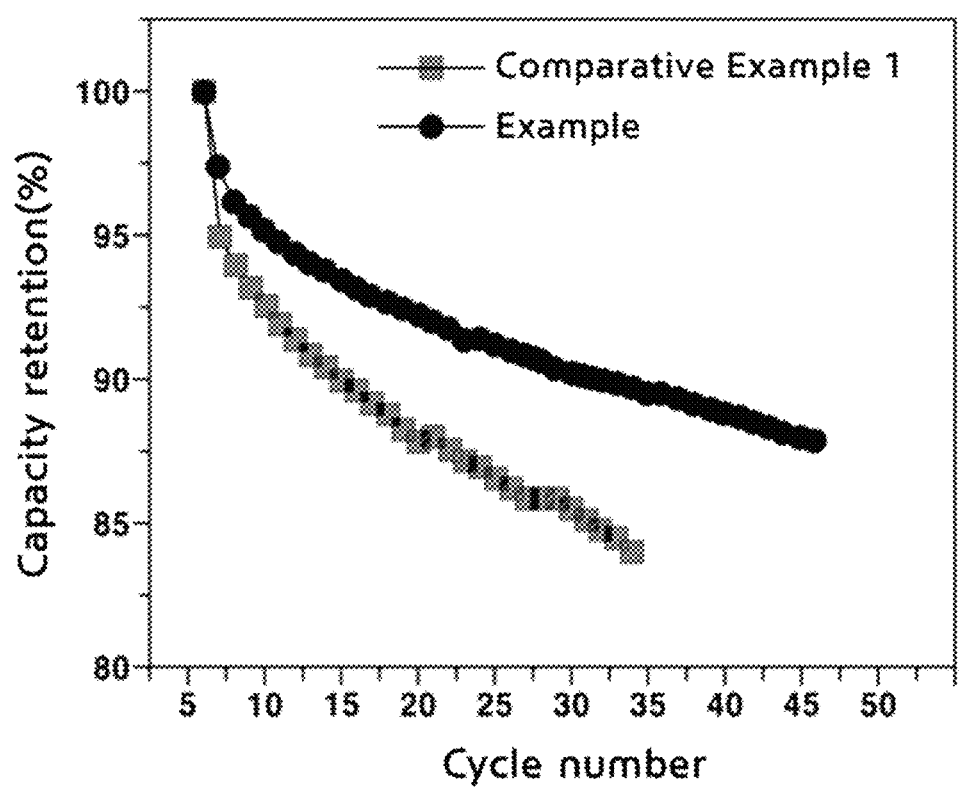
FIG. 6A shows the results of measurement of capacity retention of the all-solid-state batteries of Example and Comparative Example 1.
Figure 6B:
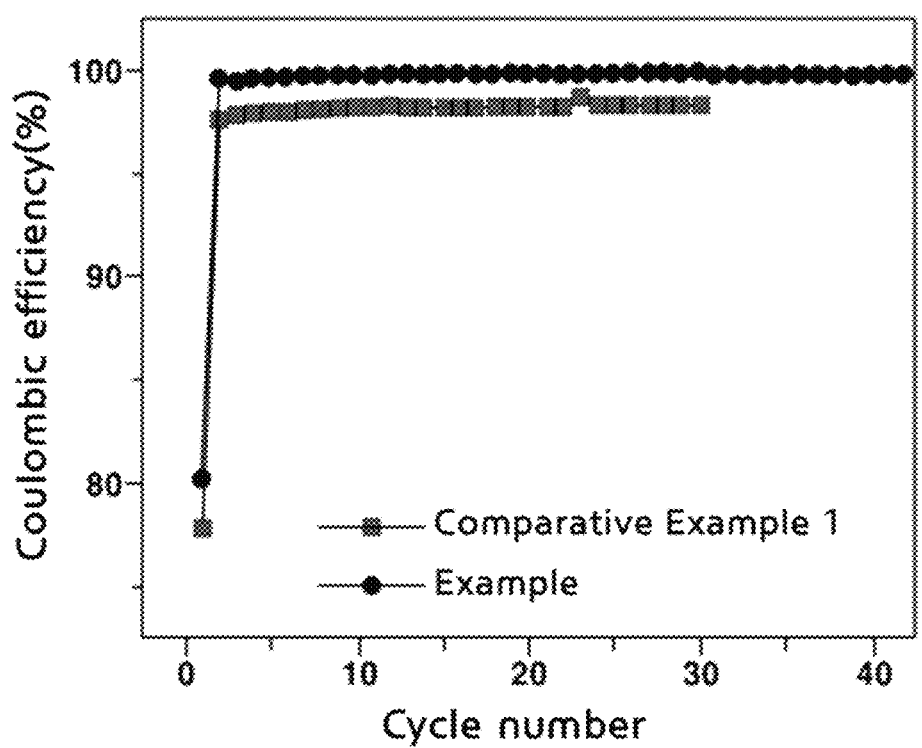
FIG. 6B shows the results of measurement of coulombic efficiency of the all-solid-state batteries of Example and Comparative Example 1.

FIG. 6A shows the results of measurement of capacity retention, and FIG. 6B shows the results of measurement of coulombic efficiency. With reference thereto, it can be seen that the capacity retention and coulombic efficiency of the all-solid-state battery of Example were superior to those of Comparative Example.

The test examples and examples of the present disclosure have been described in detail above, but the scope of the present disclosure is not limited to the test examples and examples described above. Various modifications and improvements capable of being devised by those skilled in the art using the basic concept of the present disclosure.

What is claimed is:

1. An anodeless all-solid-state battery, comprising:
an anode current collector;
a lithium storage layer comprising:
a first layer located at an electrolyte-layer side, and
a second layer located at an anode current collector side, having a higher porosity than the first layer, and including an interface portion and a core portion, which is a remaining portion other than the interface portion;
an electrolyte layer; and
a cathode layer,
wherein the anode current collector, the lithium storage layer, the electrolyte layer, and the cathode layer are sequentially laminated, and
wherein the interface portion is in contact with the first layer and has a higher binder content per unit volume than the core portion.

2. The anodeless all-solid-state battery of claim 1, wherein the lithium storage layer comprises a carbon material and a metal powder.

3. The anodeless all-solid-state battery of claim 2, wherein the carbon material comprises at least one selected from a group consisting of a particulate carbon material, a fibrous carbon material, and combinations thereof.

4. The anodeless all-solid-state battery of claim 3, wherein the particulate carbon material comprises at least one selected from a group consisting of carbon black, graphitizable carbon, non-graphitizable carbon, and combinations thereof.

5. The anodeless all-solid-state battery of claim 3, wherein the fibrous carbon material comprises at least one selected from a group consisting of carbon nanofibers, carbon nanotubes, vapor-grown carbon fibers, and combinations thereof.

6. The anodeless all-solid-state battery of claim 2, wherein the metal powder comprises at least one selected from a group consisting of aluminum (Al), zinc (Zn), indium (In), silver (Ag), gold (Au), magnesium (Mg), silicon (Si), bismuth (Bi), germanium (Ge), platinum (Pt), antimony (Sb), and combinations thereof.

7. The anodeless all-solid-state battery of claim 1, wherein a thickness ratio of the first layer and the second layer is 1:0.5-2.

8. The anodeless all-solid-state battery of claim 1, wherein the first layer has a porosity of 5% or less.

9. The anodeless all-solid-state battery of claim 1, wherein the second layer has a porosity of 5% to 50%.

10. The anodeless all-solid-state battery of claim 1, wherein the first layer comprises a polyvinylidene fluoride (PVDF) binder.

11. The anodeless all-solid-state battery of claim 1, wherein the second layer comprises a polyvinylidene fluoride (PVDF) binder and a nitrile butadiene rubber (NBR) binder.

12. The anodeless all-solid-state battery of claim 1, wherein the interface portion has a higher nitrile butadiene rubber binder content per unit volume than the core portion.

13. The anodeless all-solid-state battery of claim 1, wherein a thickness of the interface portion is 0.1% to 10% of a thickness of the second layer.

14. A method of manufacturing an anodeless all-solid-state battery, the method comprising:
preparing a first binder solution comprising a polyvinylidene fluoride (PVDF) binder and a first solvent;

preparing a second binder solution comprising a nitrile butadiene rubber (NBR) binder and a second solvent different from the first solvent;

preparing a first slurry comprising a carbon material, a metal powder, and the first binder solution; preparing a second slurry by adding the second binder solution to the first slurry;

forming a second layer by applying the second slurry on a substrate;

forming a first layer by applying the first slurry on the second layer and obtaining a lithium storage layer comprising the first layer and the second layer; and forming an all-solid-state battery by sequentially laminating an anode current collector, the lithium storage layer, an electrolyte layer, and a cathode layer, wherein: the first layer of the lithium storage layer is located at an electrolyte-layer side and the second layer, which has a higher porosity than the first layer, is located at an anode-current-collector side, the second layer comprises an interface portion, which is in contact with the first layer, and a core portion, which is a remaining portion other than the interface portion, and the interface portion has a higher binder content per unit volume than the core portion.

15. The method of claim 14, wherein the second solvent has a lower density than the first solvent, has a higher solubility of a nitrile butadiene rubber (NBR) binder than a solubility of a polyvinylidene fluoride (PVDF) binder, or has a higher vapor pressure than the first solvent.

16. The method of claim 14, wherein the first solvent comprises N-methyl-2-pyrrolidone (NMP) and the second solvent comprises hexyl butyrate.

17. The method of claim 14, wherein the second slurry has a lower solid content than the first slurry.

18. The method of claim 14, wherein a solid content of the first slurry is 4 wt % to 10 wt %.

19. The method of claim 14, wherein a solid content of the second slurry is 3 wt % or less.

20. The method of claim 14, further comprising, after applying the second slurry on the substrate, drying or standing the second layer, and allowing the second binder solution to rise to a surface of the second layer.

* * * * *